(12) United States Patent
Shacklette et al.

(10) Patent No.: US 8,384,341 B2
(45) Date of Patent: Feb. 26, 2013

(54) BATTERY CELL FOR MEMS DEVICE AND RELATED METHODS

(75) Inventors: Lawrence Wayne Shacklette, Melbourne, FL (US); Louis Joseph Rendek, Jr., West Melbourne, FL (US); David M. Smith, Sebastian, FL (US)

(73) Assignee: Harris Corporation, Melbourne, FL (US)

( * ) Notice: Subject to any disclaimer, the term of this patent is extended or adjusted under 35 U.S.C. 154(b) by 634 days.

(21) Appl. No.: 12/607,472

(22) Filed: Oct. 28, 2009

(65) Prior Publication Data

US 2011/0095720 A1   Apr. 28, 2011

(51) Int. Cl.
*H02J 7/00* (2006.01)
*H01M 2/14* (2006.01)
*G06F 7/64* (2006.01)

(52) U.S. Cl. ........ 320/101; 429/129; 429/149; 327/342; 136/291; 323/906

(58) Field of Classification Search .................... 320/101
See application file for complete search history.

(56) References Cited

U.S. PATENT DOCUMENTS

| | | | | |
|---|---|---|---|---|
| 5,338,625 | A | 8/1994 | Bates et al. | 429/193 |
| 5,880,921 | A * | 3/1999 | Tham et al. | 361/233 |
| 6,610,440 | B1 * | 8/2003 | LaFollette et al. | 429/122 |
| 6,765,363 | B2 * | 7/2004 | LaFollette et al. | 320/107 |
| 6,861,170 | B2 | 3/2005 | Lewis, Jr. et al. | 429/27 |
| 7,045,372 | B2 | 5/2006 | Ballantine et al. | 438/19 |
| 7,321,457 | B2 * | 1/2008 | Heald | 359/291 |
| 2004/0018421 | A1 * | 1/2004 | LaFollette et al. | 429/122 |
| 2004/0053124 | A1 * | 3/2004 | LaFollette et al. | 429/149 |
| 2004/0061543 | A1 * | 4/2004 | Nam et al. | 327/342 |
| 2004/0191626 | A1 | 9/2004 | Lewis, Jr. et al. | 429/224 |
| 2007/0273463 | A1 | 11/2007 | Yazdi | 335/78 |
| 2008/0248382 | A1 * | 10/2008 | Sastry et al. | 429/129 |
| 2009/0009847 | A1 * | 1/2009 | Sasagawa et al. | 359/238 |

OTHER PUBLICATIONS

Somu, et al., "Towards Novel Nano-Constructs: Novel Materials and Assembly for the Next Generation Rechargeable Batteries," Center for High-rate Nanomanufacturing, Northeastern University, Aug. 24, 2009.

\* cited by examiner

*Primary Examiner* — Yalkew Fantu
(74) *Attorney, Agent, or Firm* — Allen, Dyer, Doppelt, Milbrath & Gilchrist, P.A.

(57) ABSTRACT

A micro electrical-mechanical systems (MEMS) device INCLUDES a MEMS substrate and at least one MEMS structure on the MEMS substrate. In addition, there is at least one battery cell on the MEMS substrate coupled to the at least one MEMS structure. The at least one battery cell includes a support fin extending vertically upward from the MEMS substrate and a first electrode layer on the support fin. In addition, there is an electrolyte layer on the cathode layer, and a second electrode layer on the electrolyte layer. The support fin may have a height greater than a width. The first electrode layer may have a processing temperature associated therewith that exceeds a stability temperature associated with the second electrode layer.

26 Claims, 4 Drawing Sheets

US 8,384,341 B2

BATTERY CELL FOR MEMS DEVICE AND RELATED METHODS

FIELD OF THE INVENTION

The present invention relates to the field of micro electrical-mechanical systems (MEMS) and, more particularly, to battery cells for MEMS and related methods.

BACKGROUND OF THE INVENTION

Micro electrical-mechanical systems (MEMS) are typically made from components of 1 to 100 micrometers in size, and MEMS devices generally range in size from 20 micrometers to a millimeter, involving the integration of both electrical and mechanical elements, sensors, actuators, and the like on a substrate utilizing micro-fabrication technology. MEMS devices are particularly useful because they may combine the computational ability of microelectronics with the perception capabilities of microsensors and the precise control capabilities of microactuators. Indeed, the fabrication and integration of these elements on a single substrate may allow the realization of complete systems on a single chip.

MEMS technology has already become commonplace in today's world and is employed in a variety of applications, such as accelerometers that detect collisions in cars, pressure sensors that detect air pressure in car tires, and optical switching for communications. Components of MEMS devices, such as controllers and actuators, often require a power source. In some cases, it may not be desirable, convenient, or feasible to draw power from an external source. As such, battery cells sized for integration in MEMS devices have been developed.

For example, U.S. Pat. Pub. 2004/0191626 to Lewis, Jr. et al. discloses a volumetric lithium-ion battery for use in MEMS. The battery is constructed from materials capable of providing one Joule per cubic millimeter and has a higher capacity than typical planar MEMS batteries because it is thicker in the dimension perpendicular to the plane of the electrodes, designated the Z dimension. The MEMS battery has a volume of approximately one cubic millimeter, and the layers thereof are arranged in a vertically stacked arrangement.

U.S. Pat. No. 5,338,625 to Bates et al. discloses a thin film battery for use in MEMS devices. The battery includes a lithium anode, a vanadium oxide cathode, and an electrochemically stable electrolyte sandwiched therebetween so that the layers are arranged in a vertically stacked arrangement. In order for an implementation of either of these batteries to generate larger voltages, however, it may require many cells arrayed on a large percentage of the available space of the substrate upon which they are carried, which may not be desirable.

U.S. Pat. No. 6,610,440 to LaFollette et al. discloses a battery for use in MEMS. Individual battery cells of this battery each include an anode, a cathode, and an electrolyte sandwiched therebetween so that these layers are arranged in a vertically stacked arrangement. The individual battery cells are arranged adjacent each other on a silicon substrate and may be coupled in series or parallel. The generation of higher voltages with such a battery may require numerous such battery cells, which, in the aggregate, may undesirably consume a large percentage of the available space on the silicon substrate.

SUMMARY OF THE INVENTION

In view of the foregoing background, it is therefore an object of the present invention to provide a battery cell for a MEMS device that conserves valuable space on a MEMS substrate yet produces desired voltages.

This and other objects, features, and advantages in accordance with the present invention are provided by a micro electrical-mechanical systems (MEMS) device that includes a substrate and at least one MEMS structure on the substrate. The MEMS device has at least one battery cell on the substrate that is coupled to the at least one MEMS structure. The at least one battery cell comprises a support fin extending vertically upward from the MEMS substrate and a first electrode layer on the support fin that comprises the cathode. There is an electrolyte layer on the cathode layer, and a second electrode layer on the electrolyte layer that comprises the anode.

The support fin may have a height greater than a width. Indeed, the support fin may have a height greater than 30 µm and a width less than 20 µm. This battery cell advantageously conserves valuable space on the MEMS substrate while providing a greater voltage than prior batteries for MEMS devices.

The first electrode layer may have a processing temperature associated therewith that exceeds a stability temperature associated with the second electrode layer. The at least one battery cell may comprise a plurality thereof, and a pattern of electrically conductive traces may couple the plurality of battery cells in series. This series connection of the plurality of battery cells advantageously allows for a greater output voltage than possible with either a single battery cell, or a plurality of battery cells connected in parallel.

The first electrode layer may comprise a cathode layer, and the second layer may comprise an anode layer. The support fin may comprise an electrically conductive material, for example, copper. In addition, the first electrode layer may comprise Lithium Cobalt Oxide. The electrolyte layer may comprise a glass electrolyte, such as Lithium Phosphorous Oxynitride (LiPON). The second electrode layer may comprise Lithium.

The MEMS device may include semiconductor circuitry on the MEMS substrate coupled to the at least one MEMS structure and the at least one battery cell. In addition, there may be at least one photovoltaic cell on the MEMS substrate for charging the at least one battery cell. The inclusion of a photovoltaic cell may be particularly advantageous in that it, together with the battery cell, can be used to construct a self contained MEMS device with a long lifetime, as this battery cell design may have an operating life of more than 50,000 charge and discharge cycles.

A method aspect is directed to a method of making a micro electrical-mechanical systems (MEMS) device comprising forming at least one MEMS structure on a MEMS substrate and forming at least one battery cell on the MEMS substrate to be coupled to the at least one MEMS structure. The at least one battery cell is formed by at least forming a support fin extending vertically upward from the MEMS substrate and forming a first electrode layer on the support fin. An electrolyte layer may be formed on the cathode layer, and a second electrode layer may be formed on the electrolyte layer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to show similar elements in other embodiments.

Figure 1:
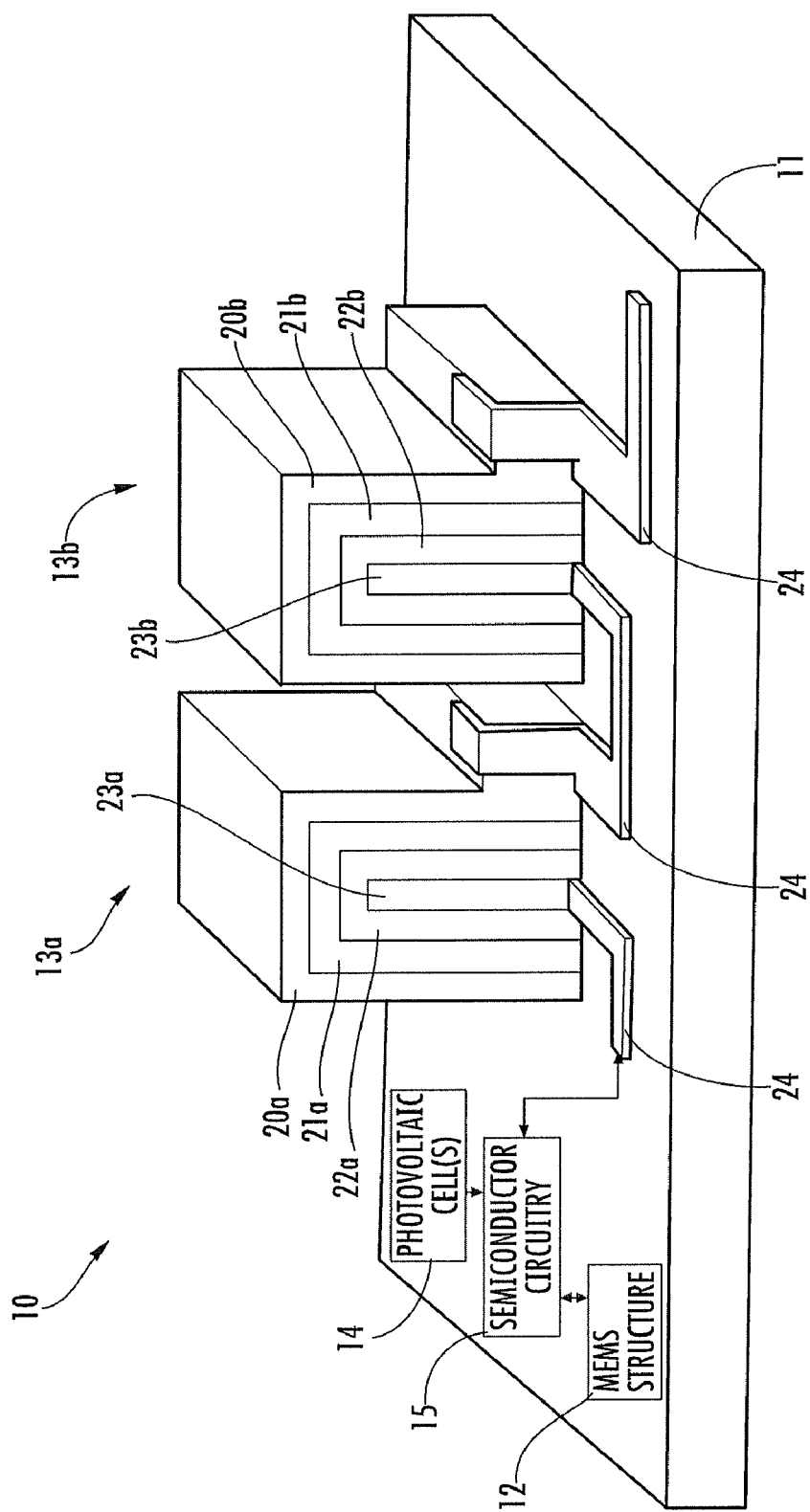
FIG. 1 is a perspective view of a MEMS device in accordance with the present invention.

Referring initially to FIG. 1, a MEMS device 10 is now described. The MEMS device 10 includes a MEMS substrate 11 that carries two battery cells 13a, 13b, a MEMS structure 12, a photovoltaic cell 14, and semiconductor circuitry 15. The MEMS structure 12, the photovoltaic cell 14, and the semiconductor circuitry 15 are coupled to the battery cells 13a, 13b via conductive traces on the MEMS substrate 11. The photovoltaic cell 14 is of a type known to those skilled in the art and is coupled to the battery cells 13a, 13b for recharging the battery cells through the semiconductor circuitry via conductive traces. The semiconductor circuitry 15 may include a processor that is coupled to the MEMS structure 12 for control thereof via conductive traces, and may also include power control circuitry to regulate battery charging and supply voltage for the MEMS circuitry.

The MEMS substrate may typically be silicon, although in other embodiments it may be polymer, ceramic, metal, or other suitable materials. The MEMS structure 12 may be an actuator, accelerometer, pressure sensor, or gyroscope, for example.

Further details of the battery cells 13a, 13b are now given with additional reference to FIG. 1. The battery cells 13a, 13b are coupled together in series via conductive traces 14. This advantageously allows a high voltage MEMS battery to be constructed from a plurality of such battery cells 13a, 13b. The conductive traces may be gold, copper, nickel or another suitable conductor.

Each battery cell 13a, 13b includes a support fin 23a, 23b extending vertically upward from the MEMS substrate 11. The support fins 23a, 23b are constructed from copper, although other suitable materials may also be used. The copper or other suitable metal that comprises the fin may also be coated by a second metal or alloy to improve the oxidation resistance or to impart a diffusion barrier. The height of the support fins 23a, 23b is illustratively greater than their width. The height of the support fins 23a, 23b is preferably greater than 30 micrometers and the width is preferably less than 20 micrometers, although support fins with other dimensions may be used. Consequently, the height of each battery cell 13a, 13b is greater than its width, advantageously conserving valuable space on the MEMS substrate 11. In some applications, the side walls of the fins may not be vertical, but rather may be sloped in a manner that the base of the fin may be wider than the top, with a height greater than a width at the base. By shaping the battery cells 13a, 13b in such a fashion many such cells can fit on the MEMS substrate 11 and can be coupled in series to create a high voltage battery, such as 50 to 150 volts, or coupled in parallel to create a battery capable of delivering higher currents, or in a series-parallel configuration to balance both voltage and power capability.

First electrode layers, illustratively cathodes 22a, 22b, are on the support fins 23a, 23b. The cathodes 22a, 22b may be formed from lithium cobalt oxide, although other suitable materials may be used. For example, a cathode constructed from any lithium intercalation compound having open channels or layers that can accommodate the diffusion and storage of lithium ions without inducing an irreversible change in the surrounding framework would be suitable. Such suitable materials include for example, lithium manganese oxide, lithium nickel oxide and lithium iron phosphate.

Electrolyte layers 21a, 21b are on the cathode layers 22a, 22b. The electrolyte layers 21a, 21b are preferably constructed from lithium phosphorous oxynitride glass, although other solid state electrolytes, such as a variety of lithium containing salts, ceramics, glasses and polymers, may be used. The use of a solid electrolyte instead of a liquid electrolyte reduces the chance of issues such as damage to the battery cell and its surroundings due to liquid leakage, and leaching of electrode material.

Second electrode layers, illustratively anodes 20a, 20b, are on the electrolyte layer 21a, 21b. The anodes 20a, 20b are preferably constructed from metallic lithium, although other suitable materials capable of storing lithium ions or alloying with lithium metal, such as carbon, silicon, tin, or the like, may also be used.

The cathode layers 22a, 22b, and the anode layers 20a, 20b are preferably of uniform thicknesses, although need not be so. Likewise, the electrolyte layers 21a, 21b are also preferably of uniform thicknesses, although they also need not be so.

Figure 2:
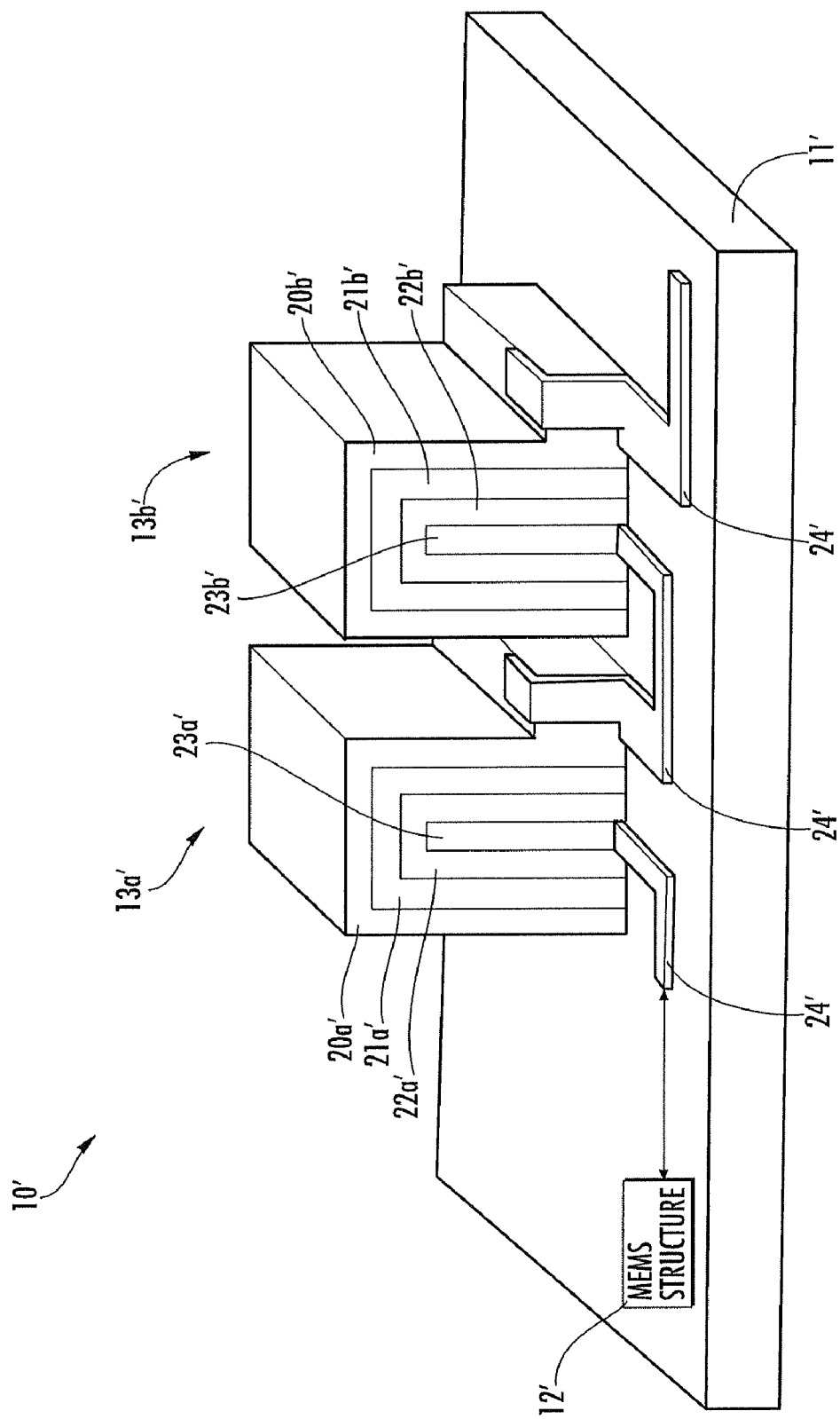
FIG. 2 is a perspective view of another embodiment of a MEMS device in accordance with the present invention.

Those of skill in the art will appreciate that, in some embodiments, the MEMS device 10' need not include photovoltaic cells and semiconductor circuitry, as shown in FIG. 2. The elements of the MEMS device 10' not specifically mentioned are similar to those of the MEMS device 10 as described above with respect to FIG. 1 and require no further description herein.

Figure 3:
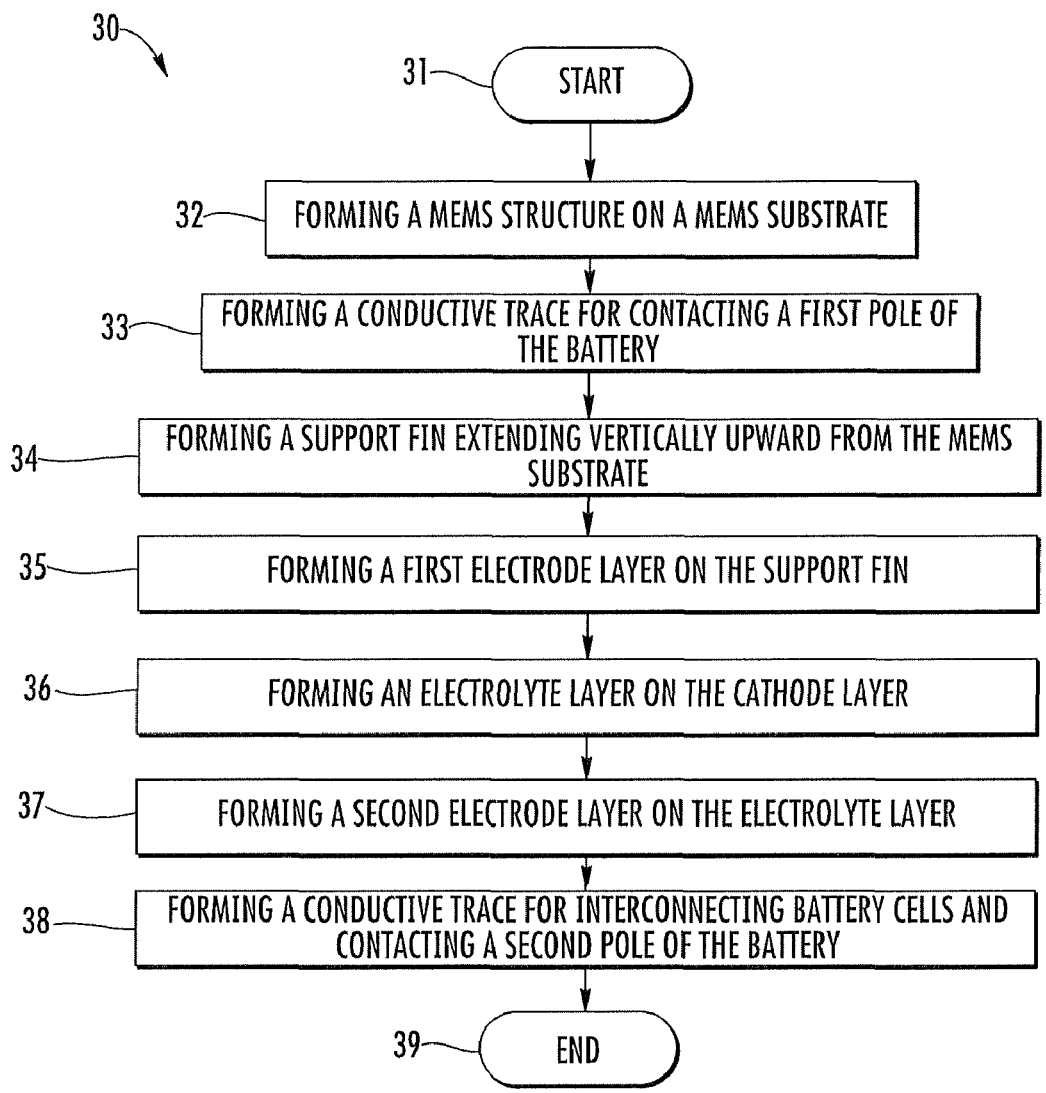
FIG. 3 is a flowchart of a method of making a MEMS device in accordance with the present invention.

With reference to the flowchart 30 of FIG. 3, a method of making a MEMS device is now described. After the start (Block 31), at Block 32, a MEMS structure is formed on a MEMS substrate. Next, a conductive trace is formed for contacting a first pole of the battery (Block 33).

Thereafter, at least one battery cell is formed on the MEMS substrate to be coupled to the MEMS structure. The battery cell is formed by forming a support fin extending vertically upward from the MEMS substrate (Block 34), and forming a first electrode layer on the support fin (Block 35). An electrolyte layer is formed on the cathode layer (Block 36), and a second electrode layer is formed on the electrolyte layer (Block 37). A conductive trace is then formed for interconnecting battery cells and contacting a second pole of the battery (Block 38). Block 39 indicates the end of the method.

Those of skill in the art will appreciate that the MEMS structure may be formed after all or part of the battery cell in some applications. For example, the MEMS structure may be formed after the cathode so the MEMS structure would not be exposed to the same process temperatures as the cathode. It may also be advantageous to form part of the battery cell, for example the support fin, during formation of the MEMS structure.

Figure 4:
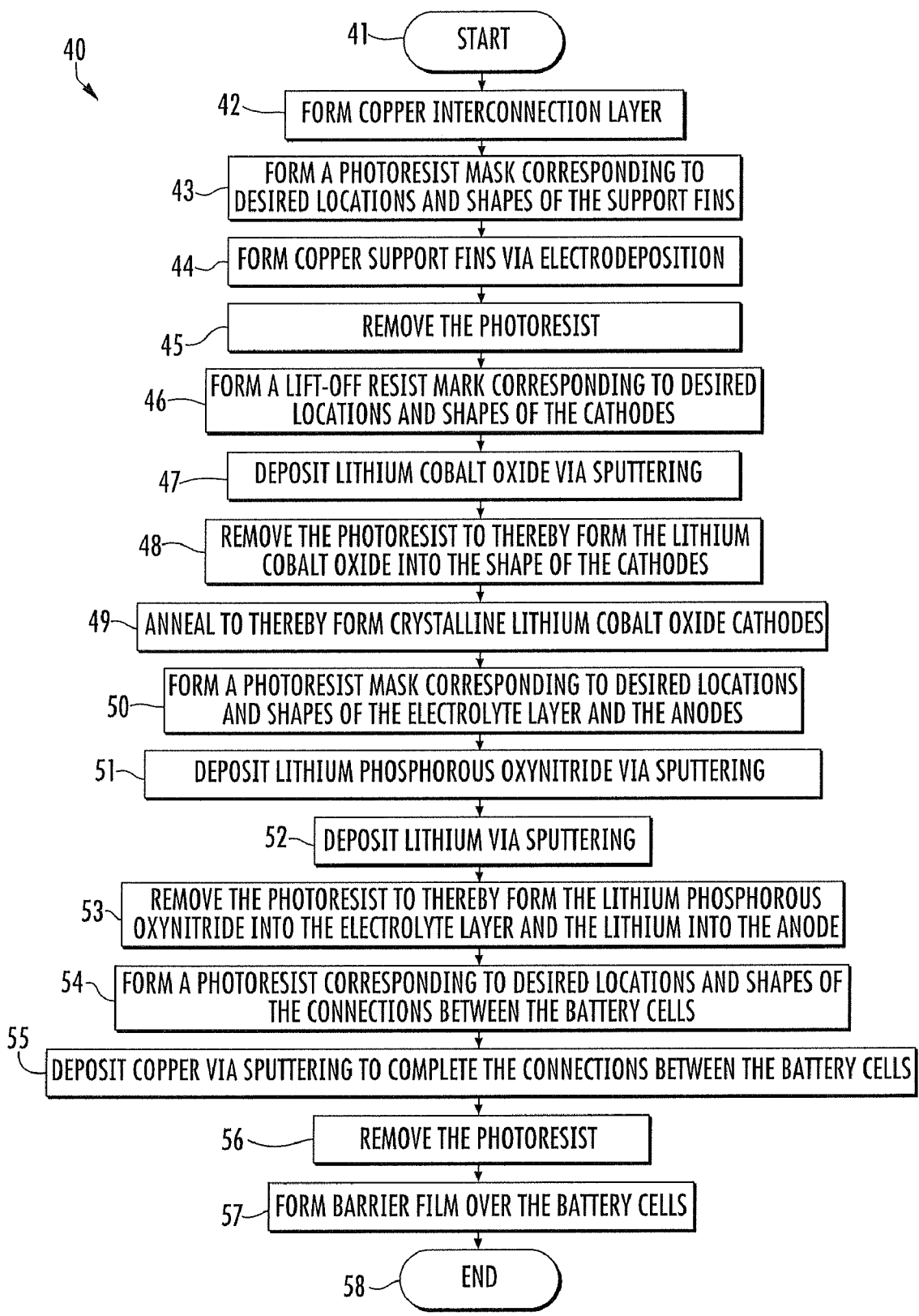
FIG. 4 is a more detailed flowchart of a method of making a battery cell for a MEMS device in accordance with the present invention.

Further details of the formation of the battery cells 13a, 13b are now given with reference to flowchart 40 of FIG. 4. After the start (Block 41), at Block 42, a copper interconnection layer is formed on the MEMS substrate using techniques known to those of skill in the art. At Block 43, a photoresist mask corresponding to desired locations and shapes of the support fins is formed on the MEMS substrate.

At Block 44, the support fins are formed from copper via electrodeposition. At Block 45, the photoresist mask is then removed. At Block 46, a lift-off resist mask corresponding to desired locations and shapes of the cathodes is formed, and at block 47, lithium cobalt oxide is deposited via sputtering. At Block 48, the lift-off resist mask, together with the excess lithium cobalt oxide is removed, thereby leaving lithium cobalt oxide formed into the desired shape of the cathodes. At Block 49, the MEMS substrate is annealed to thereby form crystalline lithium cobalt oxide cathodes.

At Block 50, a photoresist mask is formed on the MEMS substrate that corresponds to desired locations and shapes of the electrolyte layer and the anodes. At Block 51, lithium phosphorous oxynitride (LiPON) for the electrolyte layer is deposited via sputtering, and at Block 52, lithium for the anode is deposited via sputtering. At Block 53, the photoresist is removed to thereby form the LiPON into the electrolyte layer and the lithium into the anode.

As will be appreciated by those skilled in the art, the lithium cobalt for the cathodes is annealed at a temperature greater than a stability temperature (such as a melting point) of the lithium for the anodes. For this reason, the cathodes are advantageously formed before the anodes.

At Block 54, a photoresist corresponding to desired locations and shapes of the connections between the battery cells is formed. At Block 55, cooper is deposited via sputtering to complete the connections between the battery cells and optionally between the battery poles and the power buss for the device. At Block 56, the photoresist is removed. At Block 57, a barrier film is formed over the battery cells, and the method ends at Block 58.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A micro electrical-mechanical systems (MEMS) device comprising: a substrate; at least one MEMS structure on said substrate; and at least one battery cell on said substrate coupled to said at least one MEMS structure and comprising a support fin extending vertically upward from said substrate and having has a height greater than a width, a first electrode layer on said support fin, an electrolyte layer on said first electrode layer, and a second electrode layer on said electrolyte layer.

2. The MEMS device according to claim 1 wherein said first electrode layer has a processing temperature associated therewith that exceeds a stability temperature associated with said second electrode layer.

3. The MEMS device according to claim 1 wherein said at least one battery cell comprises a plurality of battery cells, and further comprising a pattern of electrically conductive traces coupling said plurality of battery cells in series.

4. The MEMS device according to claim 1 wherein said first electrode layer comprises a cathode layer, and said second electrode layer comprises an anode layer.

5. The MEMS device according to claim 1 wherein said support fin comprises an electrically conductive material.

6. The MEMS device according to claim 5 wherein said electrically conductive material comprises copper.

7. The MEMS device according to claim 1 wherein said first electrode layer comprises Lithium Cobalt Oxide.

8. The MEMS device according to claim 1 wherein said electrolyte layer comprises a glass electrolyte.

9. The MEMS device according to claim 8 wherein said glass electrolyte comprises Lithium Phosphorous Oxynitride (LiPON).

10. The MEMS device according to claim 1 wherein said second electrode layer comprises Lithium.

11. The MEMS device according to claim 1 further comprising semiconductor circuitry on said MEMS substrate coupled to said at least one MEMS structure and said at least one battery cell.

12. The MEMS device according to claim 1 further comprising at least one photovoltaic cell on said MEMS substrate for charging said at least one battery cell.

13. The MEMS device according to claim 1 wherein said support fin has a height greater than 30 μm and a width less than 20 μm.

14. A micro electrical-mechanical systems (MEMS) device comprising:
a substrate;
at least one MEMS structure on said substrate;
a plurality of battery cells on said substrate coupled to said at least one HEMS structure, each comprising
a support fin extending vertically upward from said substrate and having a height greater than a width,
a first electrode layer on said support fin,
an electrolyte layer on said first electrode layer, and
a second electrode layer on said electrolyte layer; and
a pattern of electrically conductive traces coupling said plurality of battery cells in series.

15. The MEMS device according to claim 14 wherein said first electrode layer has a processing temperature associated therewith that exceeds a stability temperature associated with said second electrode layer.

16. The MEMS device according to claim 14 wherein said first electrode layer comprises a cathode layer, and said second electrode layer comprises an anode layer; and wherein said support fin comprises an electrically conductive material.

17. The MEMS device according to claim 14 wherein said electrolyte layer comprises a glass electrolyte.

18. A method of making a micro electrical-mechanical systems (MEMS) device comprising: forming at least one MEMS structure on a substrate; and forming at least one battery cell on the substrate to be coupled to the at least one MEMS structure by at least forming a support fin extending vertically upward from the substrate and having a height greater than a width, forming a first electrode layer on the support fin, forming an electrolyte layer on the first electrode layer, and forming a second electrode layer on the electrolyte layer.

19. The method according to claim 18 wherein the first electrode layer is formed to have a processing temperature associated therewith that exceeds a stability temperature associated with the second electrode layer.

20. The method according to claim 19 wherein the at least one battery cell comprises a plurality of battery cells, and further comprising forming a pattern of electrically conductive traces to couple the plurality of battery cells in series.

21. The method according to claim 18 wherein the first electrode layer is formed as a cathode layer, and the second electrode layer is formed as an anode layer.

22. The method according to claim 18 wherein the support fin is formed from an electrically conductive material.

23. The method according to claim 18 wherein the electrolyte layer is formed from a glass electrolyte.

24. The method according to claim 18 further comprising position at least one photovoltaic cell on the substrate for charging the at least one battery cell.

25. The MEMS device according to claim 1 wherein, the support fin has a top surface and sidewalls extending downwardly therefrom, and the first electrode layer is on the top surface and the sidewalls of the support fin.

26. The method according to claim 18 wherein, the support fin has a top surface and sidewalls extending downwardly therefrom, and wherein forming the first electrode layer comprises forming the first electrode layer on the top surface and the sidewalls of the support fin.

* * * * *